United States Patent [19]

McNaughton et al.

[11] Patent Number: 5,228,728
[45] Date of Patent: Jul. 20, 1993

[54] TUBE RETAINER RELEASE SLEEVE

[75] Inventors: James McNaughton, Rochester; Mark G. Ketcham, Marine City, both of Mich.

[73] Assignee: Huron Products Industries, Inc., New Haven, Mich.

[21] Appl. No.: 809,688

[22] Filed: Dec. 17, 1991

[51] Int. Cl.⁵ .......................................... F16L 35/00
[52] U.S. Cl. ..................................... 285/319; 285/93
[58] Field of Search ............... 285/315, 319, 308, 322, 285/93

[56] References Cited

U.S. PATENT DOCUMENTS

| | | | |
|---|---|---|---|
| 2,954,248 | 9/1960 | Brickman | 285/319 |
| 3,711,125 | 1/1973 | Dehar | 285/111 |
| 4,288,113 | 9/1981 | Saulnier | 285/308 X |
| 4,487,437 | 12/1984 | Dickirson | 285/319 |
| 4,524,995 | 6/1985 | Bartholomew | 285/54 |
| 4,630,848 | 12/1986 | Twist et al. | 285/315 |
| 4,691,943 | 9/1987 | DeLand et al. | 285/315 |
| 4,793,637 | 12/1988 | Laipply et al. | 285/39 |
| 4,846,506 | 7/1989 | Bocson et al. | 285/4 |
| 4,915,421 | 4/1990 | Dennany, Jr. | 285/39 |
| 4,919,457 | 4/1990 | Moretti | 285/308 X |
| 4,944,536 | 7/1990 | Bartholomew | 285/319 |
| 4,948,176 | 8/1990 | Bartholomew | 285/319 |
| 4,979,765 | 12/1990 | Bartholomew | 285/308 |

Primary Examiner—Richard E. Moore
Attorney, Agent, or Firm—Kinzer, Plyer, Dorn, McEachran & Jambor

[57] ABSTRACT

A release sleeve used with quick connect tube connectors includes a plurality of planar surfaces at an outer peripheral surface which bias retainer legs radially outwardly to allow removal of a tube. The use of planar surfaces provides a greater contact area than prior art release sleeves, thus reducing the amount of force necessary to allow tube removal. In a further feature of the present invention, the release sleeve has grooves at an outer peripheral surface which allow passage of indicator legs such that the release sleeve may be used in combination with an indicator used to give an indication that a tube is fully connected.

19 Claims, 3 Drawing Sheets

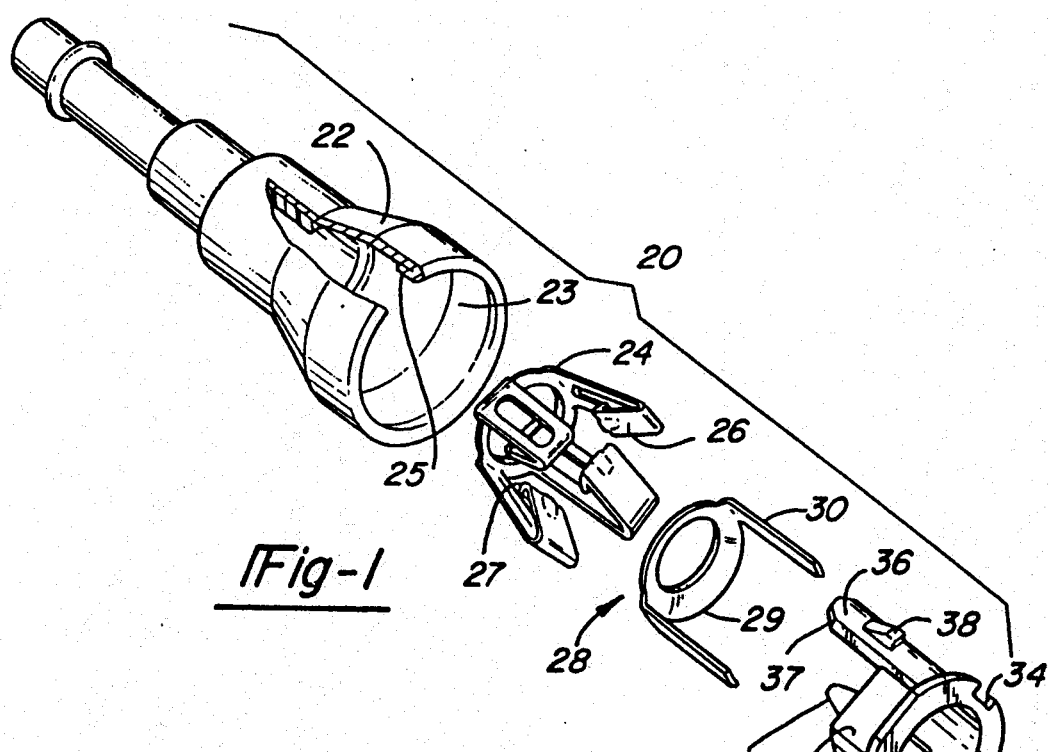
_Fig-1_
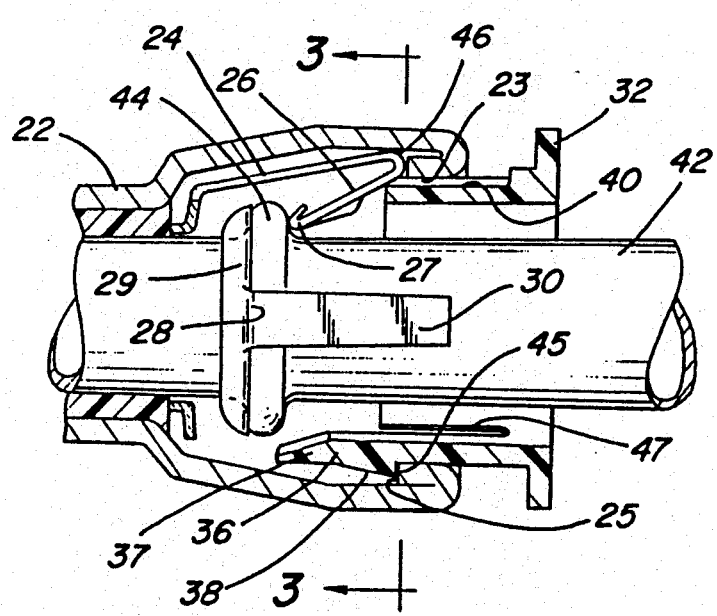
_Fig-2_

TUBE RETAINER RELEASE SLEEVE

BACKGROUND OF THE INVENTION

The present invention is directed to a release sleeve for use with quick connect tube connectors.

Quick connect tube connectors are widely used in a variety of fluid connections. A retainer typically has a plurality of legs which extend axially and radially inwardly of a housing bore to an axially inner end. A tube is secured in the bore by the retainer legs. The tube has a nominal outer diameter which is approximately equal to the inner diameter of the axially inner end of the retainer legs. An upset portion on the tube has a greater outer diameter at a location spaced axially inwardly of the axially inner end of the retainer legs. The upset portion outer diameter is greater than the inner diameter of the retainer legs at the axially inner end, such that the legs abut the upset portion and prevent tube removal.

The retainer legs are typically resilient. The tube is inserted into the housing by forcing the upset portion into the retainer legs, which are displaced radially outwardly and allow passage of the upset portion. Once the upset portion moves axially beyond the axially inner end of the retainer legs, the retainer legs return radially inwardly, and secure the tube within the housing.

The prior art may have positioned a release sleeve on the tube to allow release of the tube from the retainer. The prior art release sleeves are forced inwardly of the bore of the housing to force the retainer legs radially outwardly to a release position. Once the retainer legs have been moved radially outwardly, the upset portion may be removed axially from the housing bore.

The prior art release sleeves have typically had generally cylindrical outer peripheral surfaces. The inner peripheral surface of the retainer legs is often planar. The contact between the release sleeve and the inner periphery of the retainer legs is thus at distinct points, and an undesirably high force is required for the release sleeve to move the retainer legs to the release position.

Also, prior art release sleeves have not been able to be used with indicators, such as are often used with quick connect tube connectors to indicate when a tube is fully connected. The prior art release sleeves have thus been somewhat deficient.

SUMMARY OF THE INVENTION

In a disclosed embodiment of the present invention, a release sleeve is slidable on a tube received in a housing bore. A retainer has legs which extend axially and radially inwardly to abut an upset portion of the tube, and retain the tube within the housing bore. The release sleeve has generally planar outer peripheral surfaces which selectively force the retainer legs radially outwardly, to allow removal of the tube from the bore. The release sleeve planar surfaces are circumferentially aligned with the legs, and the legs preferably also have generally planar radially inner peripheral surfaces such that there is line contact between the release sleeve and the retainer legs.

In a further feature of the present invention, an indicator may be positioned on the tube with legs extending axailly outwardly of the housing. The amount that the legs extend axially outwardly of the housing is visually monitored to determine whether the tube is fully connected within the housing. Grooves are formed at an outer peripheral surface of the release sleeve and allow passage of the indicator legs. The grooves on the release sleeve allow the indicator to be used in combination with the release sleeve. Further, the grooves ensure that the indicator is properly positioned circumferentially relative to the retainer.

These and other objects and features of the present invention can be best understood from the following specification and drawings, of which the following is a brief description.

BRIEF DESCRIPTION OF THE DRAWINGS

FIG. 1 is an exploded view of an inventive connector.

FIG. 2 is a cross-sectional view through a fully assembled connector.

DETAILED DESCRIPTION OF A PREFERRED EMBODIMENT

Figure 3:
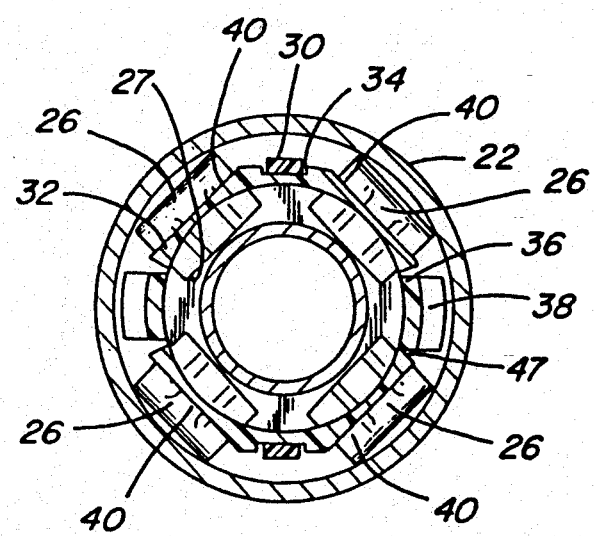
FIG. 3 is a cross-sectional view along line 3—3 as shown in FIG. 2.

A fluid connector 20 illustrated in FIG. 1 includes a housing 22 having an entrance bore 23 which receives a retainer 24. A planar end face 25 provides an abutment surface to maintain retainer 24 in housing 22. Retainer 24 has a plurality of resilient legs 26 which extend axially and radially inwardly of bore 23 to an axially inner edge 27. The inner peripheral surface of legs 26 is generally planar. Thus, axially inner edge 27 is generally linear and tangent to a central axis of entrance bore 23. Retainer 24 retains a tube within housing 22, as will be explained below.

An indicator 28 includes a forward ring 29 and a plurality of legs 30 extending axially outwardly from forward ring 29. As will be explained below, the position of indicator 28 indicates whether a tube is fully connected within housing 22.

A release sleeve 32 includes an axially outer end ring 33, and a pair of passage grooves 34 spaced by 180°. A pair of retention arms 36 are spaced by 90° from passage grooves 34. Retention arms 36 have angled axially inner ends 37, which facilitate proper alignment of release sleeve 32 and retainer 24. A retention portion 38 extends radially outwardly from the radially outer surface of retention arms 36. A plurality of planer release surfaces 40 are positioned intermediate passage grooves 34 and retention arms 36. Release surfaces 40 are circumferential aligned with legs 26 on retainer 24. Passage groove 34 extends from the axially inner end of release surfaces 40 axially through end ring 33.

As shown in FIG. 2, retainer 24 retains a tube 42 within housing 22 by having axially inner edges 27 of legs 26 abut an upset portion 44 of tube 42. Legs 26 extend axially and radially inwardly from a axially outer end 46 to axially inner edge 27. Axially inner edge 27 has an inner peripheral surface which is of a diameter less than the outer diameter of upset portion 44, such that legs 26 block removal of upset portion 44 and retain tube 42 within housing 22. The illustrated position is defined as a fully connected position of tube 42.

With tube 42 fully connected within housing 22, as shown, indicator legs 30 do not extend axially outwardly of entrance bore 23. This gives a visual indication that tube 42 is fully connected within housing 22. Alternatively, legs 30 may extend slightly axially outwardly of entrance bore 23 in the fully connected position, and the amount that they extend outwardly of entrance bore 23 provides an indication of whether tube 42 is fully connected.

Legs 26 have a bend at axially outer end 46 which abuts planer end face 25 of entrance bore 23. Retention portion 38 has an axially outer planer end surface 45, which abuts planer end face 25 to retain release sleeve 32 within entrance bore 23. As further shown, retention arms 36 are separated from planer surfaces 40 by slots 47.

As shown in FIG. 3, legs 30 of indicator 28 extend through grooves 34. Planer release surfaces 40 are circumferential aligned with legs 26 on retainer 24. Grooves 34 and legs 26 are spaced circumferential between intermediate planar release surfaces 40. Grooves 34 ensure that indicator legs 30 are circumferentially spaced from retainer legs 26.

Figure 4:
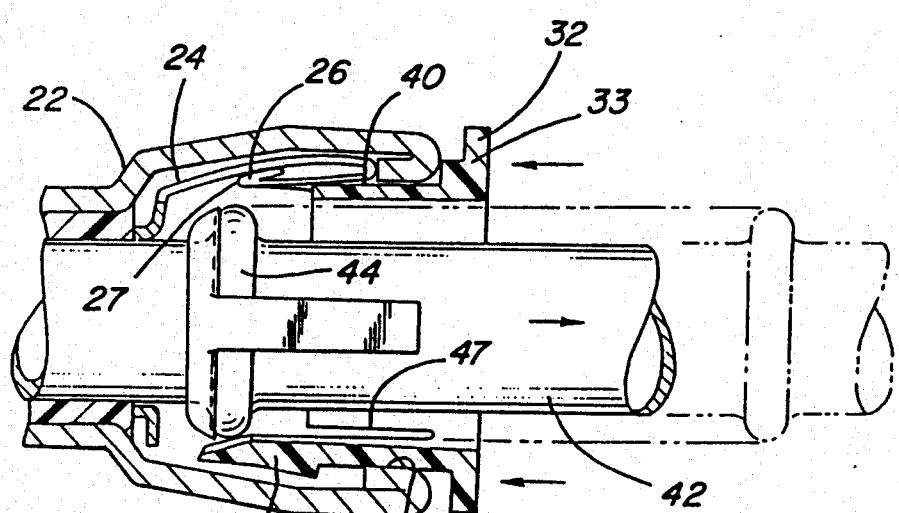
FIG. 4 is a cross-sectional view similar to that shown in FIG. 2, but showing the connector in a release position.

As shown in FIG. 4, when it is desired to release tube 42 from housing 22, one merely pushes outer ring 33 of release sleeve 32 axially inwardly. Release surfaces 40 ride along the inner peripheral surface of legs 26 of retainer 24, and force legs 26 radially outwardly. Tube 42 may now be moved axially outwardly beyond axially inner edges 27 of legs 26. Since planer surfaces 40 have a planer outer peripheral surface, and since legs 26 have a planer inner peripheral surface, there is line contact. This reduces the force necessary to move retainer 32 inwardly and cause legs 26 to move to the release position shown in FIG. 4. Further, planar release surfaces 40 result in a stronger construction for release sleeve 32.

Figure 5:
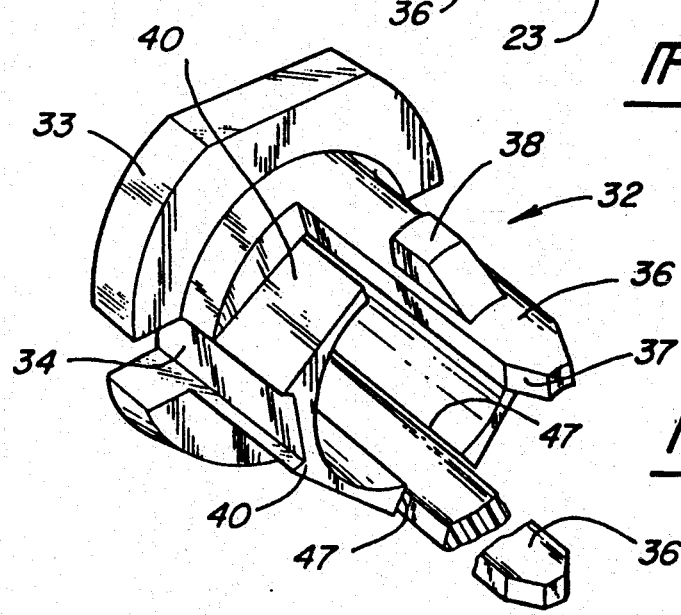
FIG. 5 is a perspective view of a release sleeve according to the present invention.

As shown in FIG. 5, grooves 34 extend from the axially innermost end of release surfaces 40 axially through outer ring 33. Retention arms 36 are spaced circumferential between adjacent release surfaces 40. Grooves 34 and retention arms 36 are spaced from each other by 90°.

Figure 6:
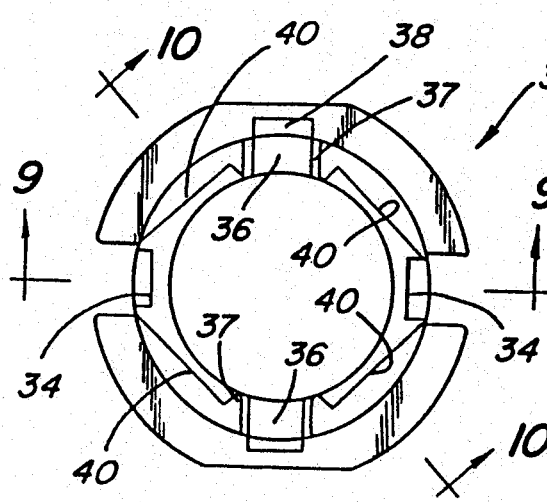
FIG. 6 is an end view of the release sleeve.

As shown in FIG. 6, retention arms 36 have retention portion 38 extending radially outwardly from an outer peripheral surface, and inner angled ends 37. Slots 47 separate retention arms 36 from the adjacent release surfaces 40.

Figure 7:
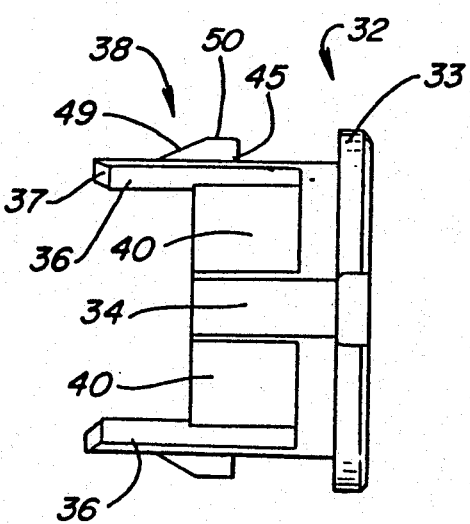
FIG. 7 is a side view of the release sleeve.

As shown in FIG. 7, retention portion 38 includes an axially inner ramp portion 49 extending axially and radially inwardly from an axially outer flat portion 50. Flat portion 50 is generally parallel to an axis of release sleeve 32. Flat portion 50 leads to the axially outer planar end surface 45 which abuts planar end face 25 of bore 23.

Figure 8:
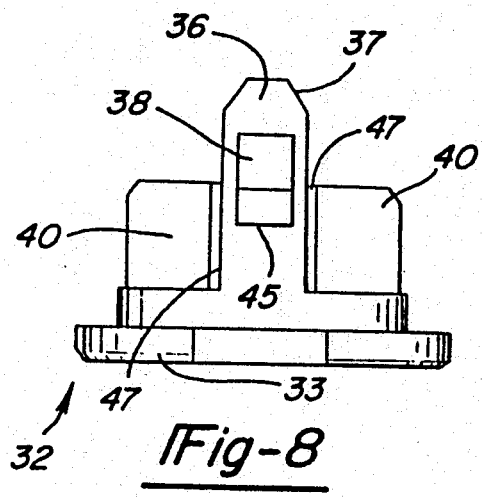
FIG. 8 is another side view of the release sleeve, shifted by 90° from the view shown in FIG. 7.

As shown in FIG. 8, axially inner ends 37 of retention arms 36 are angled. Slots 47 separate arms 36 from release surfaces 40. This allows arms 36 to flex radially inwardly and allow passage of retention portions 38 inwardly of entrance bore 23 to initially positioned release sleeve 32 in housing 22.

Figure 9:
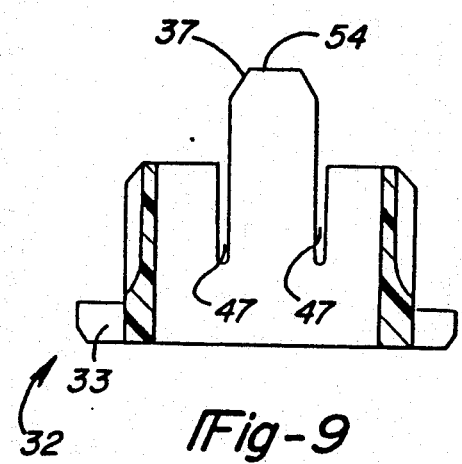
FIG. 9 is a cross-sectional view along line 9—9 as shown in FIG. 6.

As shown in FIG. 9, inner peripheral surface 54 of arms 36 is separated from adjacent inner peripheral surfaces by slots 47.

Figure 10:
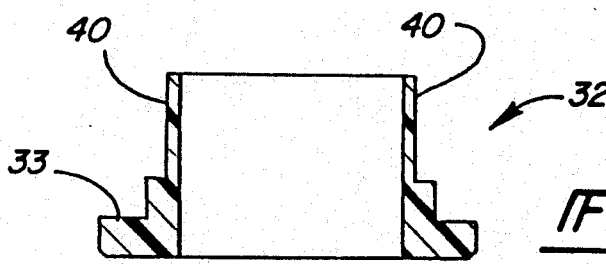
FIG. 10 is a cross-sectional view along line 10—10 as shown in FIG. 6.

As shown in FIG. 10, release sleeve 32 has an axially inner portion, including release surfaces 40, which is of a first smaller outer diameter. Axially outer ring 33 has an axially outer second portion which is of a greater outer diameter. Outer ring 33 receives the force to force release sleeve 32 axially inwardly of housing bore 23.

Preferably, release sleeve 32 is formed from a plastic. In one embodiment a polyester material was used. The release sleeve is preferably formed by injection molding.

A preferred embodiment of the present invention has been disclosed, however, a worker of ordinary skill in the art would recognize that certain modifications would come within the scope of this invention. For that reason, the following claims should be studied in order to determine the true scope and content of this invention.

We claim:

1. A fluid connector comprising;
   a housing defining a bore extending along a central axis for receiving a tube;
   a retainer disposed in said bore for securing said tube in said bore, said retainer having a plurality of legs with axially outer ends adjacent an entrance to said bore, said legs having an inner peripheral surface spaced from said axis by a first distance at said axially outer end, and said legs extending axially and radially inwardly from said axially outer end to an axially inner end, said legs having an inner peripheral surface spaced from said axis by a second distance at said axially inner end, said second distance being less than said first distance;
   a tube received in said bore and having an outer peripheral surface spaced from said axis by a third distance which is less than said second distance over the majority of its axial length, said tube having an upset portion over a small axial extent, said upset portion being spaced from said axis by a fourth distance which is greater than said second and third distances, said upset portion being positioned axially inwardly of said axially inner end of said legs when said tube is fully inserted in said bore; and
   a release sleeve slidably received on said tube axially outwardly of said upset portion, said release sleeve having a plurality of planer surfaces at an outer peripheral surface, one of said planer surfaces being circumferential aligned with each of said legs, said planer surfaces being spaced from said axis by a fifth distance which is intermediate said first and second distances, and said release sleeve being slidable on said tube to force said axially inner end of said legs radially outwardly and allow passage of said upset portion beyond said axially inner end of said legs.

2. A fluid connector as recited in claim 1, wherein said planer surfaces extend parallel to said axis.

3. A fluid connector as recited in claim 1, wherein there are four of said legs and four of said planer surfaces.

4. A fluid connector as recited in claim 1, wherein said release sleeve has an axially inner portion of a generally smaller outer diameter and an axially outer, radially greater end portion which forms a contact surface to receive a force selectively moving said release sleeve axially inwardly of said housing.

5. A fluid connector as recited in claim 1, wherein said release sleeve has a plurality of retention arms extending axially inwardly of said bore, said retention arms having a retention portion of an outer diameter greater than the inner periphery of said entrance to said bore such that said retention arms prevent removal of said release sleeve outwardly of said housing.

6. A fluid connector as recited in claim 5, wherein said retention portion includes a flat planer surface lying in a plane perpendicular to said axis, and said entrance defining a mating flat planer surface which is also perpendicular to said axis.

7. A fluid connector as recited in claim 6, wherein said retention portion includes an axially and radially inwardly extending ramp portion and a generally flat portion axially outwardly of said ramp portion which extends to said flat planer surface.

8. A fluid connector as recited in claim 1, wherein an indicator is received on said tube and has indicator legs which extend outwardly of said bore when said tube is not fully inserted, such that visual inspection of the position of said indicator legs gives an indication of whether said tube is fully inserted, and said release sleeve has grooves at an outer peripheral surface for passage of said retainer legs axially along said release sleeve.

9. A fluid connector as recited in claim 8, wherein said release sleeve further has retention arms with a retention portion extending radially outwardly for a distance greater than the inner diameter of said entrance to said bore such that said retention portion retains said release sleeve within said entrance and prevents removal of said release sleeve.

10. A fluid connector as recited in claim 9, wherein said retention arms are positioned circumferential between adjacent planer surfaces, and said grooves are also positioned between adjacent planer surfaces, said grooves being spaced by 90° from said retention arms.

11. A fluid connector as recied in claim 1, wherein an inner peripheral surface of said legs is generally planar.

12. A fluid connector comprising;
a housing defining a bore extending along a central axis for receiving a tube;
a retainer disposed in said bore for securing said tube in said bore, said retainer having a plurality of legs with axially outer ends adjacent an entrance to said bore, said legs having an inner peripheral surface spaced from said axis by a first distance at said axially outer end, and said legs extending axially and radially inwardly from said axially outer end to an axially inner end, said legs having an inner peripheral surface spaced from said axis by a second distance at said axially inner end, said second distance being less than said first distance;
a tube received in said bore and having an outer peripheral surface spaced from said axis by a third distance which is less than said second distance over the majority of its axial length, said tube having an upset portion over a small axial extent, upset portion spaced from said axis by a fourth distance which is greater than said second and third distances, said upset portion being positioned axially inwardly of said axially inner end of said legs when said tube is fully inserted position for said tube in said bore;
an indicator member received on said tube, said indicator member having legs extending in a direction axially outwardly of said bore; and
a release sleeve slidably received on said tube axially outwardly of said upset portion, said release sleeve having grooves at an outer peripheral surface which allow passage of said indicator legs axially along said release sleeve.

13. A fluid connector as recited in claim 12, wherein said release sleeve has retention arms with a retention portion extending radially outwardly for a distance greater than an inner diameter of said entrance to said bore, such that said retention portion retains said release sleeve within said entrance and prevents removal of said release sleeve.

14. A fluid connector as recited in claim 13, wherein said retention arms are positioned circumferentially between adjacent planar surfaces, and said grooves are positioned between adjacent planar surfaces, said grooves being spaced by 90° from said retention arms.

15. A release sleeve for use with fluid connectors of the type having a housing defining a bore for receiving a tube, and a retainer having radially innermost and radially outermost inner peripheral surfaces disposed within said bore for securing said tube in said bore; said release sleeve comprising:
a generally tubular body having a plurality of planar surfaces at an outer periphery of said tubular body, said planar surfaces being spaced from a central axis extending through said tubular body by a distance which is intermediate said radially innermost and radially outermost inner peripheral surfaces of said retainer.

16. A release sleeve as recited in claim 15, wherein said planar surfaces are formed at one axial end of said release sleeve, and a radially greater end portion is formed at the opposed axial end of said release sleeve.

17. A release sleeve as recited in claim 15, wherein said planer surfaces extend parallel to said axis of said tubular body.

18. A release sleeve as recited in claim 15, wherein retention arms extend axially inwardly beyond said planar surfaces, said retention arms having a retention portion which extends radially outwardly from said central axis for a distance which is greater than an inner peripheral surface of said bore in said housing.

19. The release sleeve as recited in claim 15, wherein said release sleeve has a plurality of grooves formed at an outer peripheral surface spaced between adjacent planer surfaces, said grooves being adapted to allow passage of indicator legs.

* * * * *